(12) United States Patent
Sulser et al.

(10) Patent No.: US 11,434,956 B2
(45) Date of Patent: Sep. 6, 2022

(54) HOLDING RING FOR THE AXIAL FIXING OF A ROTARY BEARING OF A STEERING APPARATUS FOR MOTOR VEHICLES

(71) Applicants: THYSSENKRUPP PRESTA AG, Eschen (LI); thyssenkrupp AG, Essen (DE)

(72) Inventors: Hansjoerg Sulser, Gamprin (LI); Felix Vonier, Schruns (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 670 days.

(21) Appl. No.: 16/323,368

(22) PCT Filed: Aug. 4, 2017

(86) PCT No.: PCT/EP2017/069781
§ 371 (c)(1),
(2) Date: Feb. 5, 2019

(87) PCT Pub. No.: WO2018/029098
PCT Pub. Date: Feb. 15, 2018

(65) Prior Publication Data
US 2021/0285498 A1 Sep. 16, 2021

(30) Foreign Application Priority Data

Aug. 8, 2016 (DE) .................... 10 2016 114 677.3

(51) Int. Cl.
*F16C 35/063* (2006.01)
*B62D 1/16* (2006.01)
*B62D 5/04* (2006.01)

(52) U.S. Cl.
CPC .............. *F16C 35/063* (2013.01); *B62D 1/16* (2013.01); *B62D 5/0448* (2013.01); *F16C 2326/01* (2013.01)

(58) Field of Classification Search
CPC ........ F16C 35/063; B62D 1/16; B62D 5/0448
See application file for complete search history.

(56) References Cited

U.S. PATENT DOCUMENTS

| 10,196,084 B2 * | 2/2019 | Kim ..................... F16C 25/083 |
| 2010/0178003 A1 * | 7/2010 | Rusteberg ............. F16C 35/063 384/563 |

(Continued)

FOREIGN PATENT DOCUMENTS

| BE | 561 920 A | 10/1957 |
| CN | 102303641 A | 1/2012 |

(Continued)

OTHER PUBLICATIONS

English Translation of International Search Report issued in PCT/EP2017/069781, dated Aug. 4, 2017.

*Primary Examiner* — Jacob D Knutson
(74) *Attorney, Agent, or Firm* — thyssenkrupp North America, LLC

(57) ABSTRACT

A holding ring for the axial fixing of a rotary bearing of a steering apparatus for motor vehicles on a rotatable component with a cylindrical outer surface onto which an inner bearing shell of the rotary bearing is mounted, wherein the holding ring includes at least one spring tongue which lies in an axial direction resiliently against the inner bearing shell, is improved with regard to a simple design and assembly process in that the holding ring comprises radially inwardly projecting elastic fixing tongues which, in the relaxed state, extend into the radial region of the rotatable component such that, when the holding ring is pushed onto the cylindrical outer surface of the rotatable component, the (Continued)

fixing tongues are deflected elastically in an axial direction opposite to the pushing-on direction and lie with a radial preload force against the outer surface of the rotatable component.

13 Claims, 3 Drawing Sheets

(56) References Cited

U.S. PATENT DOCUMENTS

| | | | | |
|---|---|---|---|---|
| 2015/0274200 | A1* | 10/2015 | Nakamura | B62D 5/0448 |
| | | | | 180/444 |
| 2016/0121921 | A1 | 5/2016 | Schönlechner et al. | |
| 2016/0201728 | A1 | 7/2016 | Strobel | |

FOREIGN PATENT DOCUMENTS

| | | | | |
|---|---|---|---|---|
| CN | 103057581 A | 4/2013 | | |
| CN | 105408189 A | 3/2016 | | |
| CN | 105492298 A | 4/2016 | | |
| DE | 30 01 121 A | 7/1980 | | |
| DE | 33 05 419 A | 8/1984 | | |
| DE | 3305419 A1 * | 8/1984 | | F16B 21/20 |
| DE | 33 29 179 A | 12/1984 | | |
| DE | 3329179 A1 * | 12/1984 | | F16C 35/067 |
| DE | 697 02 541 T | 3/2001 | | |
| DE | 697 29 258 T | 6/2005 | | |
| DE | 10 2009 038 222 A | 2/2011 | | |
| DE | 10 2010 027 794 A | 10/2011 | | |
| DE | 10 2012 007 329 A | 10/2013 | | |
| DE | 10 2014 201 112 A | 7/2015 | | |
| DE | 10 2014 216 122 A | 2/2016 | | |
| JP | 11171026 A * | 6/1999 | | F16C 25/083 |
| JP | H11-171026 A | 6/1999 | | |
| JP | 2008 256116 A | 10/2008 | | |
| JP | 2013 151221 A | 8/2013 | | |
| JP | 5 786 731 B | 9/2015 | | |
| JP | 5786731 B2 * | 9/2015 | | F16C 35/063 |
| SU | 1 732 034 A | 5/1992 | | |

* cited by examiner

HOLDING RING FOR THE AXIAL FIXING OF A ROTARY BEARING OF A STEERING APPARATUS FOR MOTOR VEHICLES

CROSS REFERENCE TO RELATED APPLICATIONS

This application is a U.S. National Stage Entry of International Patent Application Serial Number PCT/EP2017/069781, filed Aug. 4, 2017, which claims priority to German Patent Application No. DE 10 2016 114 677.3, filed Aug. 8, 2016, the entire contents of both of which are incorporated herein by reference.

FIELD

The present disclosure generally relates to a holding ring for the axial fixing of a rotary bearing of a steering apparatus for motor vehicles on rotatable and in housing-like components.

BACKGROUND

A holding ring is known for example from JP 5 786 731 B2. Here, the bearing ring is fixed on a steering shaft by means of an axial securing element which engages into a groove of the steering shaft. In this way, the holding ring is supported in an axial direction on a flank of the groove of the steering shaft, whereas its spring tongue is pressed in an axially resilient manner against the rotary bearing and fixes the latter on the steering shaft. A similar holding ring is also known from JP H 11-171026. Here, too, the holding ring is fixed by means of a groove on a steering shaft. The known arrangements both have the disadvantage that, for the fixing of the holding ring, a groove is required in each case on the rotatable components, in this case on the steering shafts.

Thus a need exists for a holding ring which is easy to install and permits low cost manufacture of the steering apparatus.

DETAILED DESCRIPTION

Figure 1:
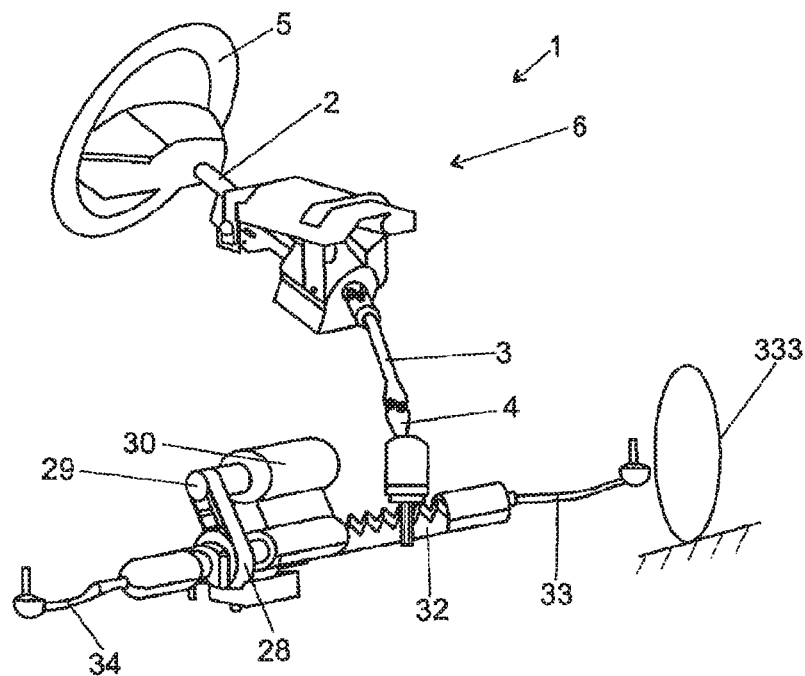
FIG. 1 is a schematic perspective view of a steering system of a motor vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a holding ring for the axial fixing of a rotary bearing of a steering apparatus for motor vehicles on a rotatable component with a cylindrical outer surface onto which an inner bearing shell of the rotary bearing is mounted, wherein the holding ring comprises at least one spring tongue which lies in an axial direction resiliently against the inner bearing shell.

The invention also relates to a holding ring for the axial fixing of a rotary bearing of a steering apparatus for a motor vehicle in a housing-like component with a cylindrical inner surface into which an outer bearing shell of the rotary bearing is inserted, wherein the holding ring comprises at least one spring tongue which lies in an axial direction resiliently against the outer bearing shell.

The holding ring comprises radially inwardly projecting elastic fixing tongues which, in the relaxed state, extend into the radial region of the rotatable component such that, when the holding ring is pushed onto the cylindrical outer surface of the rotatable component, said fixing tongues are deflected elastically in an axial direction opposite to the pushing-on direction and lie with a radial preload force against the outer surface of the rotatable component. For the fixing thereof, the holding ring according to the invention advantageously does not require any grooves on the rotatable component, and the fixing tongues of said holding ring can be of simpler design than the fixing elements known from the prior art. For the axial fixing thereof, the holding ring according to the invention requires only the outer surface of the rotatable component, on which said holding ring can be fastened in any desired axial position.

The fixing tongues are advantageously designed to be bent in a direction averted from the rotary bearing. Said fixing tongues are thus plastically deformed in the same direction as that in which an elastic deformation takes place during the pushing-on onto the rotatable component, which deformation therefore requires a lower expenditure of force. Furthermore, by means of the bent configuration of the fixing tongues, a further embodiment of the invention is made possible in which the fixing tongues press with their radially inner edges against the cylindrical outer surface of the rotatable component and dig into the outer surface thereof. In particular if the fixing tongues are composed of a harder material than the rotatable component and their radially inner edges are of particularly sharp form, they dig into the outer surface of the rotatable component in a particularly effective manner. There, the fixing tongues are then fixed against displacements in an axial direction practically exactly as firmly as in the grooves known from the prior art.

In an advantageous refinement, the holding ring comprises at least three spring tongues and/or three fixing tongues. The spring tongues and/or the fixing tongues are particularly preferably arranged so as to be distributed uniformly over the circumference of the holding ring.

In one embodiment of the invention, multiple radially inwardly projecting spring tongues are provided which are unwound in the direction of the rotary bearing. Thus, the spring tongues lie axially resiliently against multiple points of the rotary bearing. The best results with regard to the axially resilient abutment are obtained if the spring tongues are at an angle of between 15° and 45° with respect to a plane orthogonal to the axis of rotation of the rotatable component.

One refinement of the invention provides for the spring tongues to be arranged so as to be distributed in an alternating manner with the fixing tongues in a circumferential direction. By means of this measure, the axial force introduced via one spring tongue is supported directly on the rotatable component via the fixing tongues which are adjacent in a circumferential direction, and the force components introduced by the individual spring tongues are distributed uniformly over the entire circumference of the holding ring.

In a preferred embodiment, it is recommended that the holding ring be composed of spring steel. This material ensures the transmission of high elastic deformation forces necessary for the fixing of the rotary bearing.

In a first preferred use of the invention, provision is made for the rotatable component to be a steering shaft. It is particularly important for steering shafts to be supported rigidly in an axial direction in order to provide the driver with a feeling of safety.

The solution according to the invention is not only restricted to manually adjustable steering columns. The holding ring according to the invention may likewise be used in the case of a non-adjustable steering column or in the case of an electrically adjustable steering column. It is likewise conceivable and possible for the holding ring according to the invention to be used in steering systems in which there is no mechanical link between the steering wheel and the steering gear, so-called steer-by-wire steering systems.

In a second preferred use of the invention, the rotatable component is a ball-screw drive nut (of a ball-screw drive) of an electric servo steering system. Here, too, it is important for the ball-screw drive nut to be supported rigidly in an axial direction, because an elastic axial displacement between the ball-screw drive nut and the associated spindle on which the ball-screw drive nut is seated would lead to a change in the input steering angle.

The rotary bearing is preferably in the form of a rolling bearing which comprises at least one rolling body, an inner ring, an outer ring and preferably a cage. Provision may be made here for the rolling bearing to be in the form of a radial deep-groove ball bearing, a four-point bearing or an angular-contact ball bearing.

The object is furthermore achieved by means of a holding ring which comprises radially outwardly projecting elastic fixing tongues which, in the relaxed state, extend into the radial region of the housing-like component such that, when the holding ring is pushed into the cylindrical inner surface of the housing-like component, said fixing tongues are deflected elastically in an axial direction opposite to the pushing-in direction and lie with a radial preload force against the inner surface of the housing-like component.

A housing-like component is to be understood to mean that this can accommodate a rotary bearing in order to rotatably mount a rotatable component. The housing-like component is preferably in the form of a casing tube.

It is preferably possible for the fixing tongues to press with radially outer edges against the cylindrical inner surface of the housing-like component and dig into the inner surface.

The holding ring preferably comprises multiple radially outwardly projecting spring tongues which are unwound in the direction of the rotary bearing.

Where applicable, all advantageous refinements of the inventive solution of patent claim 1 can be transferred analogously, without exercising inventive skill, to the inventive solution of patent claim 10. The cylindrical outer surface or cylindrical inner surface is not restricted to only a circular cylindrical outer surface or cylindrical inner surface. The cylindrical outer surface or cylindrical inner surface is formed by an outer or inner shell surface of a cylinder or hollow cylinder which comprises any desired cross-sectional area or hollow cross-sectional area. Specifically, provision may be made for the outer surface or the inner surface to be defined by the shell surface of a circular cylinder of a hollow circular cylinder or by the shell surface of a substantially rectangular or square cylinder or hollow cylinder.

The cylindrical outer surface or the cylindrical inner surface is preferably of circular cylindrical form.

FIG. 1 shows a steering system of a motor vehicle having a steering column which comprises a multi-part steering shaft 2, 3, 4. A steering wheel 5 is connected to a steering-wheel-side steering shaft 2, which is fastenable by means of a support 6 to the chassis of a motor vehicle (not shown).

Figure 2:
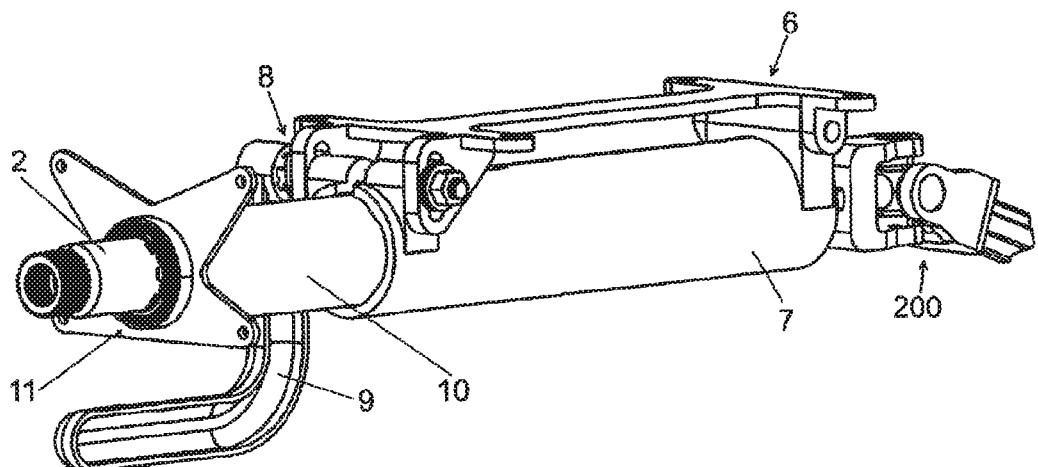
FIG. 2 is a perspective view of a steering-wheel-side portion of a steering column.

FIG. 2 shows the support 6, to which a clamping tube 7 is fastened so as to be vertically and longitudinally adjustable. For the adjustment, a clamping apparatus 8 is provided which can be clamped or released by means of an actuating lever 9. In the clamped state of the clamping apparatus 8, the clamping tube 8 fixedly clamps a casing tube 10. The clamping apparatus 8 is in the form of a cam-type stroke-imparting mechanism. It is likewise conceivable and possible for the clamping apparatus to be in the form of a tilt-pin-type clamping apparatus or rolling-body-type clamping apparatus. In general, any clamping apparatus which provides a stroke for elastically deforming the casing tube 10 such that the clamping tube 7 received in the casing tube 10 is clamped is suitable. The steering shaft 2 is mounted rotatably in the casing tube 10, wherein the steering shaft 2 is coupled, on the side averted from the steering wheel, to a universal joint 200.

Figure 3:
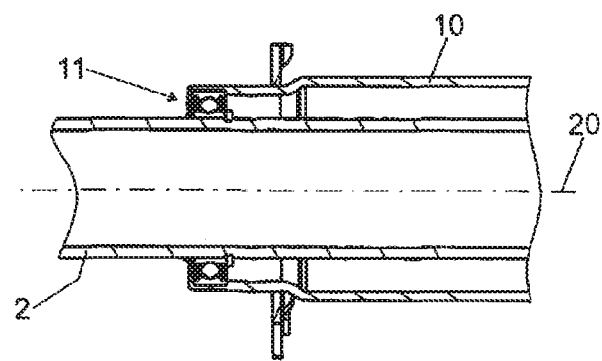
FIG. 3 is a sectional partial view of the steering column from FIG. 2.

As can be seen most clearly in FIG. 3, a rotary bearing 11 is fixed to the casing tube 10, which rotary bearing is seated on the steering shaft 2. In the enlarged illustration of FIG. 4, it can be seen that the rotary bearing is designed as a ball bearing and comprises an inner bearing shell 12, balls 13 and an outer bearing shell 14. The outer bearing shell 14 is fixed to the casing tube 10 by virtue of the outer bearing shell being supported on one side on a shoulder and, on the other side, the casing tube 10 being flanged inward after the installation of the bearing 11. The inner bearing shell 12 is fixed to the steering shaft 2, which, for this purpose, is equipped, on the right-hand axial side of the inner bearing shell 12, with a circlip 15, which is inserted into an encircling groove 16 of the steering shaft 2. On the left-hand axial side, the inner bearing shell 12 is fixed by means of a holding ring 17 according to the invention.

Figure 6:
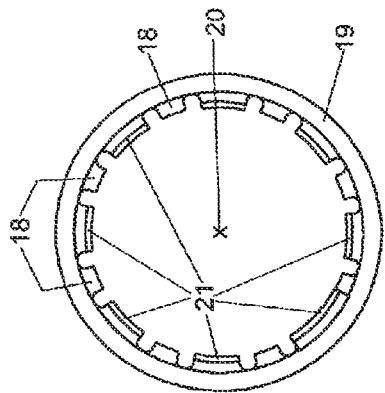
FIG. 6 is a plan view of a holding ring.
Figure 5:
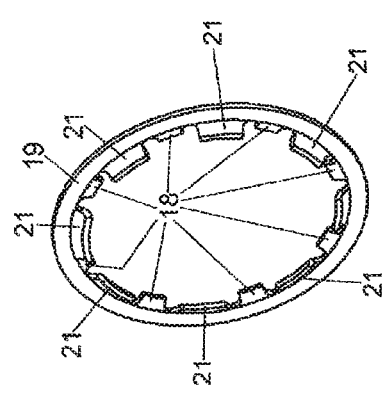
FIG. 5 is a perspective view of a holding ring.
Figure 7:
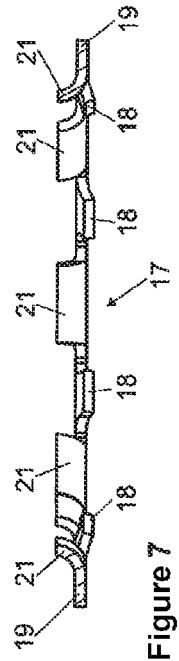
FIG. 7 is an enlarged sectional view of a holding ring.

As can be seen most clearly in FIGS. 5 to 7, the holding ring 17 comprises eight spring tongues 18 distributed over its circumference, which spring tongues project radially inward from an encircling ring body 19 and are arranged so as to be angled relative to a plane orthogonal to the axis of rotation 20 of the steering shaft 2. The described plane is, in FIG. 6, identical to the plane of the paper. The spring tongues 18 are angled so as to protrude axially in the direction of the rotary bearing 11 and, in the installed state of the holding ring 17, to lie axially resiliently against the inner bearing shell 12 of the rotary bearing 11, whereby said spring tongues press the inner bearing shell 12 in an axial direction toward the circlip 15 and thus fix the rotary bearing 11 on the steering shaft 2.

To generate the elastic preload of the spring tongues 18, the holding ring 17 must be supported on the steering shaft 2. For this purpose, eight fixing tongues 21 which project radially inward from the ring body 19 of the holding ring 17 are provided, the radial extent of which fixing tongues in an inward direction is slightly greater than that of the spring tongues 18. Therefore, in the relaxed state, the fixing tongues 21 of the uninstalled holding ring 17 project into the radial region of a cylindrical outer surface 22 of the steering shaft 2. Furthermore, the fixing tongues 21 are designed to be bent in a direction averted from the rotary bearing 11, to the left in FIG. 4, that is to say project axially from the ring body 19 of the holding ring 17 in a direction opposite to the angling of the spring tongues 17. This can be seen most clearly in FIG. 7. The eight spring tongues 18 and the eight fixing tongues 21 are arranged so as to be distributed in the circumferential direction of the holding ring 17 and so as to alternate with one another.

Figure 4:
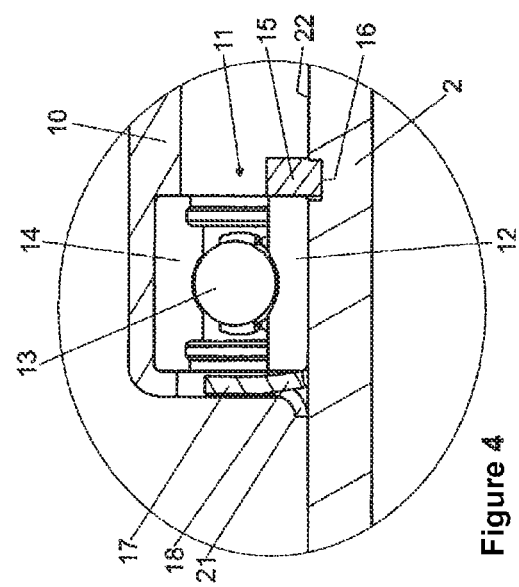
FIG. 4 is an enlarged detailed view from FIG. 3 of a rotary bearing of a steering shaft.

As the holding ring 17 is pushed in an axial direction onto the steering shaft, from left to right in FIG. 4, the fixing tongues 21 are elastically deflected by the steering shaft 2, wherein said fixing tongues are firstly deflected axially counter to the pushing-on direction, that is to say to the left in FIG. 2, and in so doing are simultaneously deflected radially outward, until they open up a region with the radius of the steering shaft 2, such that the steering shaft 2 fits through. The holding ring 17 is then pushed further in the axial direction over the cylindrical outer surface 22 of the steering shaft 2 until the spring tongues 18 lie axially resiliently against the inner bearing shell 12 of the rotary bearing 11.

The fixing tongues 21 preloaded in the installed state of the holding ring 17 now lie firmly against the cylindrical outer surface 22 of the steering shaft 2 and press with a considerable radial force against the cylindrical outer surface 22, such that the holding ring 17 can be displaced only by exertion of considerable forces. If the axial preload of the spring tongues 21 now seeks to displace the holding ring 17 to the left, the fixing tongues 21 will, owing to their bent shape, react with an intensification of the radial force component already caused by their elastic preload, such that a radially inner edge of the fixing tongues 21 digs into the material of the cylindrical outer surface 22 of the steering shaft 2 and thus, in an effective manner, prevents an axial displacement of the holding ring 17 to the left. The holding ring 17 is thus seated on the steering shaft 2 practically as firmly as if the fixing tongues 21 were to engage into a groove of the steering shaft 2, because positively locking support is generated as a result of the digging-in of the holding ring.

Figure 8:
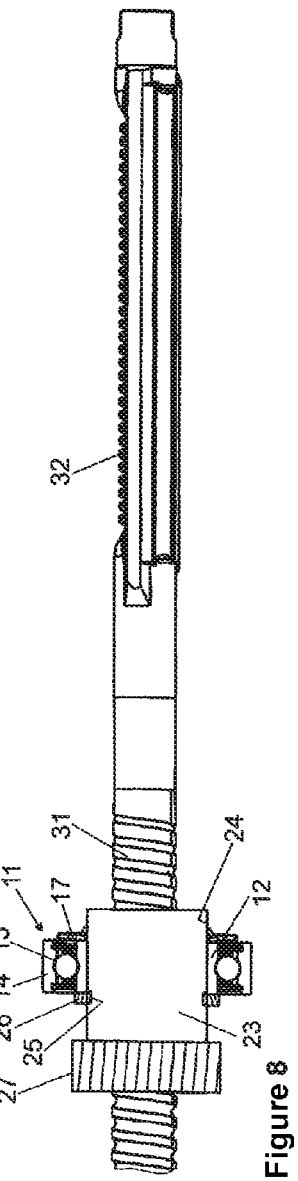
FIG. 8 is a sectional view of a spindle connected to a toothed rack and with a rotatably mounted ball-screw drive nut arranged thereon.
Figure 9:
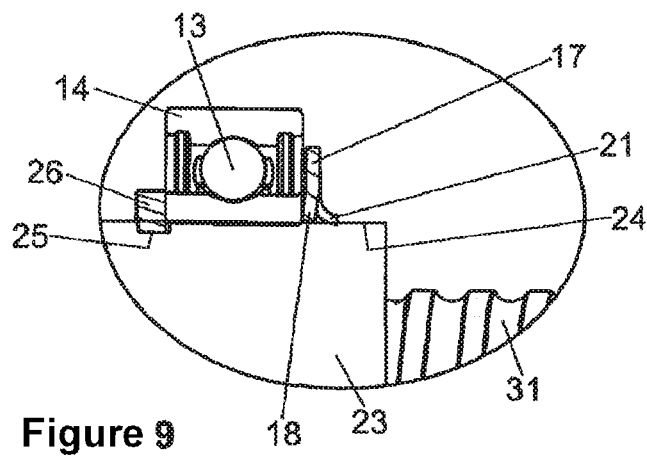
FIG. 9 is an enlarged detailed view from FIG. 8 of a rotary bearing of the ball-screw drive nut.

In a further type of use of the holding ring according to the invention, the rotatable component is a ball-screw drive nut 23 of a ball-screw drive of an electric servo steering system, which is illustrated in FIGS. 8 and 9. The ball-screw drive nut 23 likewise comprises a cylindrical outer surface 24, on which there is arranged a rotary bearing 11 composed of inner bearing shell 12, balls 13 and outer bearing shell 14. Exactly as in the case of the steering shaft 2, the cylindrical outer surface 24 is equipped with an encircling groove 25 into which a circlip 26 is inserted. The circlip 26 arranged on the left-hand axial side of the inner bearing shell 12 supports the inner bearing shell 12 in an axial direction.

The holding ring 17 is pushed axially from right to left onto the cylindrical outer surface 24 of the ball-screw drive nut 23 until the spring tongues 18 lie against the right-hand axial surface of the inner bearing shell 12. The anchoring of the fixing tongues 21 on the cylindrical outer surface 24 of the ball-screw drive nut 23 is realized analogously in the same way as in the above-described exemplary embodiment with the steering shaft 2.

For the steering actuation, the ball-screw drive nut 23 comprises, on its left-hand axial side, a pulley wheel 27 which is connected by means of a toothed belt 28 (visible in FIG. 1) to a toothed wheel 29 on the shaft of an electric motor 30. When the electric motor 30 rotates, the toothed belt 28 drives the belt pulley 27 of the ball-screw drive nut 23, which is thus likewise rotated. The ball-screw drive nut 23 is seated on a spindle 31, which in turn is connected to a toothed rack 32. The toothed rack 32 is in turn connected to a track rod 33, by means of which a steerable vehicle wheel can be pivoted. On its side opposite the toothed rack 32, the spindle 31 is connected to a further track rod 34, which pivots a further steerable vehicle wheel 333. Since the ball-screw drive nut 23 is fixed in an axial direction by means of the rotary bearing 11, a rotation of the ball-screw drive nut 23 has the effect that the spindle 31 is displaced in an axial direction and, via the track rods 33, 34, causes a turn-in of the steered vehicle wheels 333.

Figure 10:
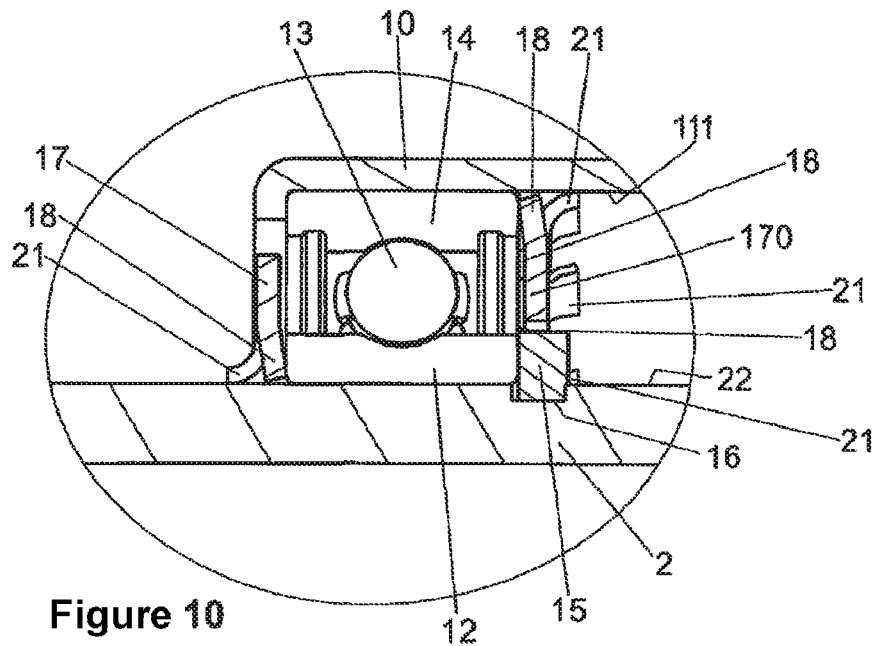
FIG. 10 is an enlarged detailed view of a rotary bearing of a steering shaft.

FIG. 10 illustrates an enlarged detail of a rotary bearing 11 of a steering shaft 2 in an alternative embodiment of a holding ring 170. The holding ring 170 serves for axially fixing a rotary bearing 11 in a casing unit 10 which is designed as a housing-like component and which comprises a cylindrical inner surface 111 into which an outer bearing shell 14 of the rotary bearing 11 is inserted, wherein the holding ring 170 comprises spring tongues 18 which lie resiliently in an axial direction against the outer bearing shell 12. The holding ring 170 furthermore comprises radially outwardly projecting elastic fixing tongues 21 which, in the relaxed state, extend into the radial region of the housing-like component 10 such that, as the holding ring 170 is pushed into the cylindrical inner surface 111 of the casing tube 10, said fixing tongues are deflected elastically in an axial direction opposite to the pushing-in direction, and lie with a radial preload force against the inner surface 111 of the housing-like component 10.

The fixing tongues 21, which are preloaded in the installed state of the holding ring 170, now lie firmly against the cylindrical inner surface 111 of the casing tube 10, and press with a radial force against the cylindrical inner surface 111, such that the holding ring 170 can be displaced only by exertion of considerable forces.

The holding ring 17, 170 according to the invention can be non-displaceably firmly mounted on the respective rotatable component or in a housing designed for the mounting of a rotatable component, for example steering shaft 2, a ball-screw drive nut 23 or a casing tube 10, in a simple manner by being pushed on or pushed in, without the need for the respective rotatable component to be equipped with a groove for the anchoring of the holding ring 17, 170. In this way, the production of the respective rotatable component is simplified, and production costs are saved.

Where applicable, all individual features and advantageous refinements presented in the individual exemplary embodiments may be combined with one another and/or interchanged with one another and/or analogously transferred from one to the other exemplary embodiment without departing from the scope of the invention.

LIST OF REFERENCE DESIGNATIONS

1 Steering column
2 Steering shaft
3 Steering shaft
4 Steering shaft
5 Steering wheel
6 Support
7 Clamping tube
8 Clamping apparatus
9 Actuating lever
10 Casing tube
11 Rotary bearing
12 Inner bearing shell
13 Balls
14 Outer bearing shell
15 Circlip
16 Groove
17,170 Holding ring
18 Spring tongue
19 Ring body
20 Axis of rotation
21 Fixing tongue
22 Cylindrical outer surface
23 Ball-screw drive nut
24 Cylindrical outer surface
25 Groove
26 Circlip
27 Belt pulley
28 Toothed belt
29 Toothed wheel
30 Electric motor
31 Spindle
32 Toothed rack
33 Track rod
34 Track rod

What is claimed is:

1. A holding ring for the axial fixing of a rotary bearing of a steering apparatus for a motor vehicle on a rotatable component with a cylindrical outer surface onto which an inner bearing shell of the rotary bearing is mounted, wherein the holding ring comprises:
at least one spring tongue which is sized and shaped to lie in an axial direction resiliently against the inner bearing shell;
radially inwardly projecting elastic fixing tongues which, in the relaxed state, are configured to extend into a radial region of the rotatable component such that, when the holding ring is pushed onto the cylindrical outer surface of the rotatable component, said fixing tongues are deflected elastically in an axial direction opposite to a pushing-on direction and lie with a radial preload force against a cylindrical-shaped portion of the cylindrical outer surface of the rotatable component,
wherein the fixing tongues are configured to press with radially inner edges against the cylindrical outer surface of the rotatable component and dig into the outer surface.

2. The holding ring of claim 1, wherein the fixing tongues are bent in a direction averted from the rotary bearing.

3. The holding ring of claim 1 wherein the at least one spring tongue comprises a plurality of radially inwardly projecting spring tongues that are unwound in the direction of the rotary bearing.

4. The holding ring of claim 3, wherein the spring tongues are at an angle of between 15° and 45° with respect to a plane orthogonal to an axis of rotation of the rotatable component.

5. The holding ring of claim 3, wherein the spring tongues are arranged so as to be distributed in an alternating manner with the fixing tongues in a circumferential direction.

6. The holding ring of claim 1, wherein said holding ring is composed of spring steel.

7. The holding ring of claim 1, wherein the rotatable component is a steering shaft.

8. The holding ring of claim 1, wherein the rotatable component is a ball-screw drive nut of an electric servo steering system.

9. The holding ring of claim 1 wherein a radially-inward-facing distal end of the at least one spring tongue has a first circumferential extent, wherein radially-inward facing distal ends of the radially inwardly projecting elastic fixing tongues have a second circumferential extent, wherein the second circumferential extent is approximately twice the first circumferential extent.

10. The holding ring of claim 1 wherein a radius of curvature of the radially inwardly projecting elastic fixing tongues that project radially inward from an encircling body is limited to 90 degrees relative to a planar face of the encircling ring body.

11. The holding ring of claim 1 wherein distal ends of the radially inwardly projecting elastic fixing tongues extend circumferentially for a first distance, wherein the radially inwardly projecting elastic fixing tongues extend radially inward a second distance from an encircling ring body, with the first distance being greater than the second distance.

12. The holding ring of claim 1 wherein both the at least one spring tongue and the radially inwardly projecting elastic fixing tongues project radially inwards from an encircling ring body, wherein prior to being pushed onto the cylindrical outer surface of the rotatable component the radially inwardly projecting elastic fixing tongues project farther axially from the encircling body than does the at least one spring tongue.

13. A holding ring for the axial fixing of a rotary bearing of a steering apparatus with a cylindrical outer surface onto which an inner bearing shell of the rotary bearing is mounted, wherein the holding ring comprises:
at least one spring tongue which is sized and shaped to lie in an axial direction resiliently against the inner bearing shell;
radially inwardly projecting elastic fixing tongues which, in the relaxed state, are configured to extend into a radial region of the rotatable component such that, when the holding ring is pushed onto the cylindrical outer surface of the rotatable component, said fixing tongues are deflected elastically in an axial direction opposite to a pushing-on direction and lie with a radial preload force against a cylindrical-shaped portion of the cylindrical outer surface of the rotatable component,
wherein both the at least one spring tongue and the radially inwardly projecting elastic fixing tongues project radially inwards from an encircling ring body, wherein the encircling ring body is configured to be parallel with a flange of a casing tube, wherein the flange of the casing tube and the encircling ring body are disposed in a common radial plane.

\* \* \* \* \*